United States Patent
Leon et al.

(10) Patent No.: US 6,315,341 B1
(45) Date of Patent: Nov. 13, 2001

(54) SHOVEL HAVING AN ADJUSTABLE BLADE ANGLE

(76) Inventors: Sandra Leon; Felix Leon, both of 9095 Spencer Ct., Gilroy, CA (US) 95020

( * ) Notice: Subject to any disclaimer, the term of this patent is extended or adjusted under 35 U.S.C. 154(b) by 0 days.

(21) Appl. No.: 09/636,610

(22) Filed: Aug. 11, 2000

(51) Int. Cl.$^7$ ............................................. A01B 1/22
(52) U.S. Cl. ............................................. 294/53.5
(58) Field of Search ..................... 294/49, 51, 53.5; 15/257.7; 172/372, 381; 403/91–94, 96, 97, 103

(56) References Cited

U.S. PATENT DOCUMENTS

| | | | |
|---|---|---|---|
| D. 284,733 | | 7/1986 | Hozumi . |
| 341,160 | * | 5/1886 | Myers ................................. 294/53.5 |
| 801,557 | * | 10/1905 | Stritter ................................ 294/53.5 |
| 881,782 | | 3/1908 | Elliott . |
| 1,261,859 | * | 4/1918 | Seiter ................................. 294/53.5 |
| 1,427,865 | * | 9/1922 | Szabo ................................. 294/53.5 |
| 1,500,132 | * | 7/1924 | Hummelgard .................. 294/53.5 X |
| 1,570,189 | | 1/1926 | Sturm . |
| 1,741,004 | | 12/1929 | Wornstaf . |
| 3,115,359 | * | 12/1963 | Hendrick ............................. 294/53.5 |
| 3,993,340 | * | 11/1976 | Rusing et al. ....................... 294/53.5 |
| 4,929,112 | | 5/1990 | Wilcox . |
| 5,810,408 | | 9/1998 | Armstrong . |

FOREIGN PATENT DOCUMENTS

| | | | |
|---|---|---|---|
| 2974 | * | 4/1900 | (DK) ................................. 294/53.5 |
| 332112 | * | 11/1935 | (IT) .................................... 294/53.5 |
| 59259 | * | 4/1938 | (NO) ................................. 294/53.5 |

* cited by examiner

*Primary Examiner*—Johnny D Cherry

(57) ABSTRACT

A shovel having an adjustable blade angle for changing the angle of the blade with respect to the handle. The shovel having an adjustable blade angle includes a handle member. The handle member is elongate and has a first end and a second end. A blade member has a front surface and a back surface. The blade has a back edge. A rod is securely attached to and extends away from the back edge of the blade member. A pair of protruding members is integrally coupled to and extends away from the second end of the handle member. The protruding members are spaced such that each of the protruding members may be positioned on an opposite side of the rod. The protruding members are pivotally coupled to the rod such that the blade member is pivotable with respect to the handle member. The handle member is selectively lockable with respect to the blade member.

8 Claims, 2 Drawing Sheets

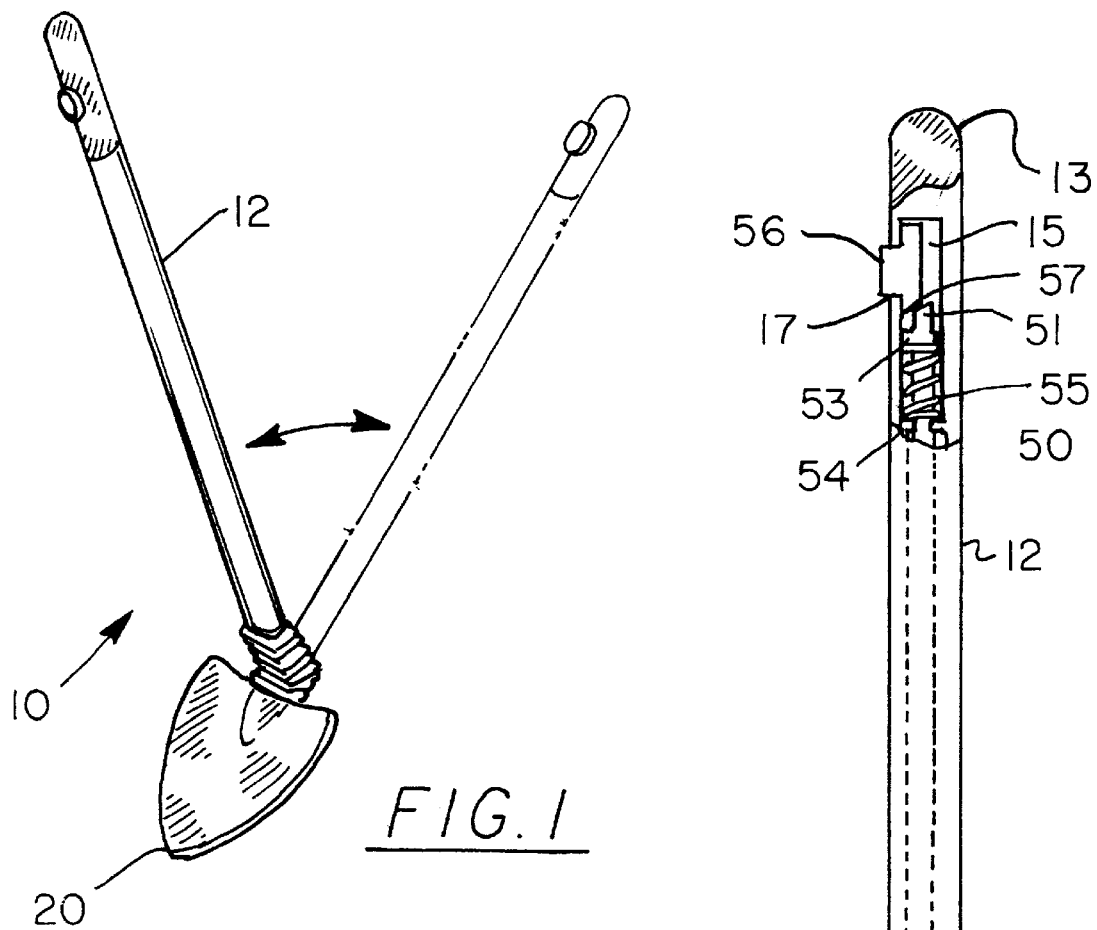
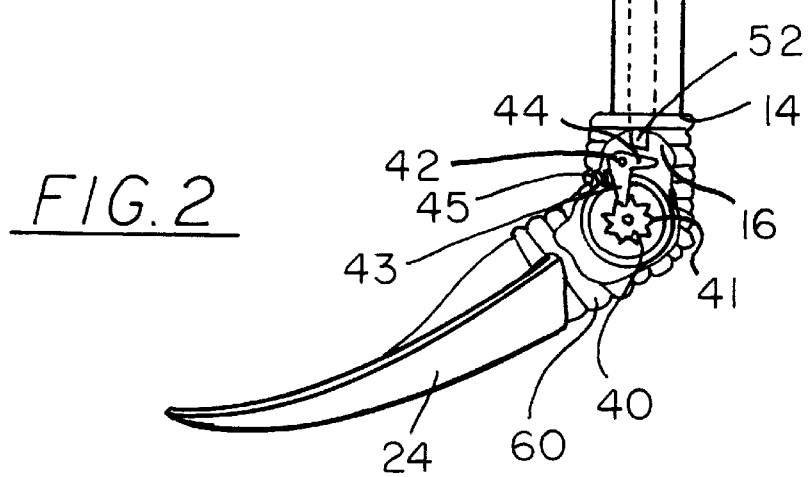
*FIG. 1*
*FIG. 2*

SHOVEL HAVING AN ADJUSTABLE BLADE ANGLE

BACKGROUND OF THE INVENTION

1. Field of the Invention

The present invention relates to shovels and more particularly pertains to a new shovel having an adjustable blade angle for changing the angle of the blade with respect to the handle.

2. Description of the Prior Art

The use of shovels is known in the prior art. More specifically, shovels heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,741,004; U.S. Pat. No. 1,570,189; U.S. Pat. No. 881,782; U.S. Pat. No. 4,929,112; U.S. Pat. No. 5,810,408; and U.S. Des. Pat. No. 284,733.

While these devices fulfill their respective, particular objectives and requirements, the aforementioned patents do not disclose a new shovel having an adjustable blade angle. The inventive device includes a handle member. The handle member is elongate and has a first end and a second end. A blade member has a front surface and a back surface. The blade has a back edge. A rod is securely attached to and extends away from the back edge of the blade member. A pair of protruding members is integrally coupled to and extends away from the second end of the handle member. The protruding members are spaced such that each of the protruding members may be positioned on an opposite side of the rod. The protruding members are pivotally coupled to the rod such that the blade member is pivotable with respect to the handle member. The handle member is selectively lockable with respect to the blade member.

In these respects, the shovel having an adjustable blade angle according to the present invention substantially departs from the conventional concepts and designs of the prior art, and in so doing provides an apparatus primarily developed for the purpose of changing the angle of the blade with respect to the handle.

SUMMARY OF THE INVENTION

In view of the foregoing disadvantages inherent in the known types of shovels now present in the prior art, the present invention provides a new shovel having an adjustable blade angle construction wherein the same can be utilized for changing the angle of the blade with respect to the handle.

The general purpose of the present invention, which will be described subsequently in greater detail, is to provide a new shovel having an adjustable blade angle apparatus and method which has many of the advantages of the shovels mentioned heretofore and many novel features that result in a new shovel having an adjustable blade angle which is not anticipated, rendered obvious, suggested, or even implied by any of the prior art shovels, either alone or in any combination thereof.

To attain this, the present invention generally comprises a handle member. The handle member is elongate and has a first end and a second end. A blade member has a front surface and a back surface. The blade has a back edge. A rod is securely attached to and extends away from the back edge of the blade member. A pair of protruding members is integrally coupled to and extends away from the second end of the handle member. The protruding members are spaced such that each of the protruding members may be positioned on an opposite side of the rod. The protruding members are pivotally coupled to the rod such that the blade member is pivotable with respect to the handle member. The handle member is selectively lockable with respect to the blade member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new shovel having an adjustable blade angle apparatus and method which has many of the advantages of the shovels mentioned heretofore and many novel features that result in a new shovel having an adjustable blade angle which is not anticipated, rendered obvious, suggested, or even implied by any of the prior art shovels, either alone or in any combination thereof.

It is another object of the present invention to provide a new shovel having an adjustable blade angle which may be easily and efficiently manufactured and marketed.

It is a further object of the present invention to provide a new shovel having an adjustable blade angle which is of a durable and reliable construction.

An even further object of the present invention is to provide a new shovel having an adjustable blade angle which is susceptible of a low cost of manufacture with regard to both materials and labor, and which accordingly is then susceptible of low prices of sale to the consuming public, thereby making such shovel having an adjustable blade angle economically available to the buying public.

Still yet another object of the present invention is to provide a new shovel having an adjustable blade angle which provides in the apparatuses and methods of the prior art some of the advantages thereof, while simultaneously overcoming some of the disadvantages normally associated therewith.

Still another object of the present invention is to provide a new shovel having an adjustable blade angle for changing the angle of the blade with respect to the handle.

Yet another object of the present invention is to provide a new shovel having an adjustable blade angle which includes a handle member. The handle member is elongate and has a first end and a second end. A blade member has a front surface and a back surface. The blade has a back edge. A rod is securely attached to and extends away from the back edge of the blade member. A pair of protruding members is integrally coupled to and extends away from the second end of the handle member. The protruding members are spaced such that each of the protruding members may be positioned on an opposite side of the rod. The protruding members are pivotally coupled to the rod such that the blade member is pivotable with respect to the handle member. The handle member is selectively lockable with respect to the blade member.

Still yet another object of the present invention is to provide a new shovel having an adjustable blade angle that is selectively lockable in a plurality of angles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new shovel having an adjustable blade angle according to the present invention.

FIG. 2 is a schematic side view of the present invention.

DESCRIPTION OF THE PREFERRED EMBODIMENT

Figure 3:
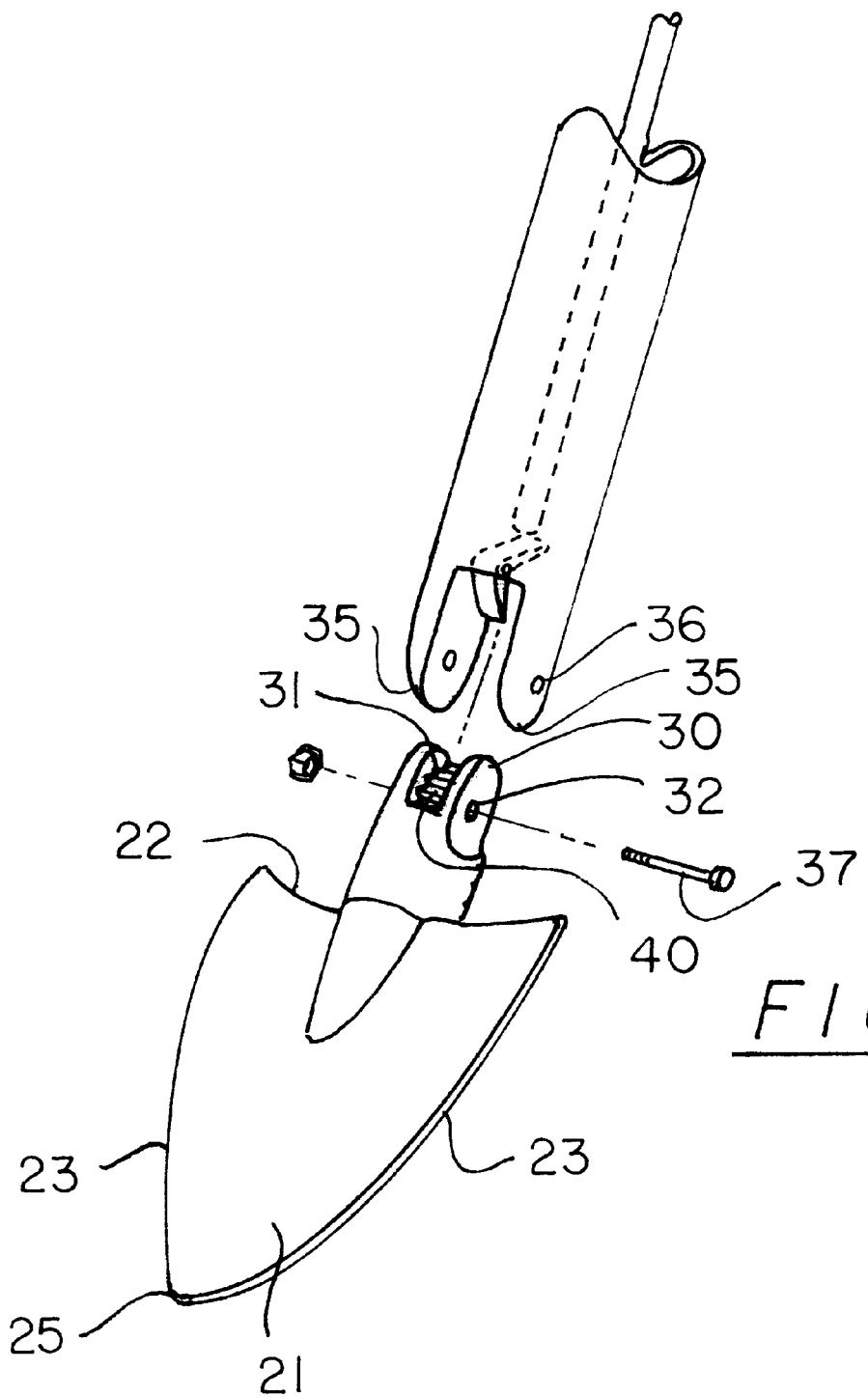
FIG. 3 is a schematic perspective view of the present invention.

With reference now to the drawings, and in particular to FIGS. 1 through 3 thereof, a new shovel having an adjustable blade angle embodying the principles and concepts of the present invention and generally designated by the reference numeral 10 will be described.

As best illustrated in FIGS. 1 through 3, the shovel having an adjustable blade angle 10 generally comprises a handle member 12. The handle member 12 is elongate and has a first end 13 and a second end 14. The handle member 12 has a lumen 15 therein. The lumen 15 extends between the first 13 and second 14 ends. The second end 14 has an opening 16 therein extending into the lumen 15. The handle 12 has an aperture 17 therein extending into the lumen 15. The aperture 17 is positioned generally adjacent to the first end 13.

A blade member 20 has a front surface 21 and a back surface 24. The blade member 20 has a back edge 22. Preferably, two side edges 23 extends from opposite ends of the back edge 22 and taper toward each other to define a point 25. The blade member 20 is a conventional blade member found on shovels.

A rod 30 is securely attached to and extends away from the back edge 22 of the blade member 20. The rod 30 has a free end having a channel 31 extending therein. The rod 30 has a pair of opposed holes 32 therein extending into the channel 31.

A pair of protruding members 35 is integrally coupled to and extends away from the second end 14 of the handle member 12. The protruding members 35 are spaced such that each of the protruding members 35 may be positioned on an opposite side of the rod 30 to define a saddle for the rod 30 to sit in. Each of the protruding members 35 has a bore 36 therethrough- Each of the bores 36 corresponds with one of the holes 32 in the rod 30 such that a pin 37 may be extended through the holes 32 and the bores 36 such that the protruding members 35 are pivotally coupled to the rod 30.

A locking means selectively locks the handle member 12 with respect to the blade member 20 such that the two are not pivotable with each other. The locking means includes a gear 40 which is securely attached to the rod 30 and positioned in the channel 31. The gear 40 has a plurality of teeth 41 thereon. A pawl 42 engages the gear 40 and is pivotally mounted in the opening 16 in the second end 14 of the handle member 12. The pawl 42 has a first arm 43 and a second arm 44. The first arm 43 of the pawl 42 may engage the teeth on the gear 40 when the rod 30 is positioned between the protruding members 35.

An urging means 45 urges the first arm 43 toward the gear 40 to keep the pawl in a locked position against the gear 40.

An actuating means releases the pawl from the gear. The actuating means comprises a pole 50 that is movably mounted in the lumen 15. The pole 50 has a first end 51 and a second end 52. The first end 51 is positioned generally adjacent to the aperture 17 in the handle member 12. The first end 51 is angled with respect to a longitudinal axis of the pole 50. The first end 51 is angled toward the aperture 17. The pole 50 has an annular ridge 53 thereon. An annular shoulder 54 is integrally coupled to and extends away from an inner peripheral side of the lumen 15. The annular shoulder 54 is positioned between the annular ridge 53 and the second end 52 of the pole 50. A biasing means 55 biases the second end 52 of the pole 50 away from the pawl 42. The biasing means 55 preferably comprises a spring that is positioned on the pole 50 and is located between the annular shoulder 54 and the annular ridge 53 such that the spring may abut the annular shoulder 54 and the annular ridge 53. A button 56 is movably positioned in the aperture 17. The button 17 has a bottom edge 57. The bottom edge 57 is located to slidably engage the first end 51 of the pole 50. Preferably, a sheath 60 is placed over the pawl and gear to protect them.

In use, the button 56 moves the pole 50 toward the pawl 42 when the button 56 is extended into the aperture 17. The second end 52 of the pole 50 may then abut the second arm 44 of the pawl 42 such that the first arm 43 of the pawl 42 is disengaged with the teeth 41 on the gear 40. This allows the blade member 20 to pivot with respect to the handle member 12. When the desired angle between the handle and blade members is achieved, the button 56 is released, the biasing means 55 biases the pole 50 away from the pawl 42, and the pawl 42 engages the gear 40 to lock the handle member 12 with respect to the blade member 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and chances will readily occur to those skilled in the art, it is not desired to limit the invention to the exact construction and operation shown and described, and accordingly, all suitable modifications and equivalents may be resorted to, falling within the scope of the invention.

We claim:

1. An adjustable shovel device, said device comprising:
   a handle member, said handle member being elongate and having a first end and a second end;
   a blade member, said blade member having a front surface, and a back surface, said blade having a back edge;
   a rod being securely attached to and extending away from said back edge of said blade member;
   a pair of protruding members being integrally coupled to and extending away from said second end of said handle member, said protruding members being spaced such that each of said protruding members may be positioned on an opposite side of said rod, said protruding members being pivotally coupled to said rod such that said blade member is pivotable with respect to said handle member;
   a locking means for selectively locking said handle member with respect to said blade member; and
   said rod having a free end having a channel extending therein, said rod having a pair of opposed holes therein extending into said channel.

2. The adjustable shovel device as in claim 1, wherein said device further comprises:
   said handle member having a lumen therein, said lumen extending between said first and second ends, said second end having an opening therein extending into said lumen, said handle member having an aperture therein extending into said lumen, said aperture being positioned generally adjacent to said first end;
   said locking means comprising;
      a gear being securely attached to said rod and positioned in said channel, said gear having a plurality of teeth thereon;
      a pawl for engaging said gear being pivotally mounted in said opening in said second end of said handle member, said pawl having a first arm and a second arm, wherein said first arm of said pawl may engage said teeth on said gear when said rod is positioned d between said protruding members; and
      an urging means urges said first arm toward said gear.

3. The adjustable shovel device as in claim 2, wherein said locking means further comprises:
   an actuating means for releasing said pawl from said gear, said actuating means comprises;
      a pole, said pole being movably mounted in said lumen, said pole having a first end and a second end, said first end being positioned generally adjacent to said aperture in said handle member;
      a biasing means biases said second end of said pole away from said pawl;
      a button, said button being movably positioned in said aperture, said button having a bottom edge, said bottom edge being located to slidably engage said first end of said pole; and
      wherein said button moves said pole toward said pawl when said button is extended into said aperture, wherein said second end of said pole may abut said second arm of said pawl such that said first end of said pawl may disengage with said teeth on said gear, wherein said blade member may pivot with respect to said handle member.

4. An adjustable shovel device, said device comprising:
   a handle member, said handle member being elongate and having a first end and a second end, said handle member having a lumen therein, said lumen extending between said first and second ends, said second end having an opening therein extending into said lumen, said handle member having an aperture therein extending into said lumen, said aperture being positioned generally adjacent to said first end;
   a blade member, said blade member having a front surface, and a back surface, said blade having a back edge, two side edges extending from opposite ends of said back edge and tapering toward each other to define a point;
   a rod being securely attached to and extending away from said back edge of said blade member, said rod having a free end having a channel extending therein, said rod having a pair of opposed holes therein extending into said channel;
   a pair of protruding members being integrally coupled to and extending away from said second end of said handle member, said protruding members being spaced such that each of said protruding members may be positioned on an opposite side of said rod, each of said protruding members having a bore therethrough, each of said bores corresponding with one of said holes in said rod such that a pin may be extended through said holes and said bores such that said protruding members are pivotally coupled to said rod;
   a locking means for selectively locking said handle member with respect to said blade member, said locking means comprising:
      a gear being securely attached to said rod and positioned in said channel, said gear having a plurality of teeth thereon;
      a pawl for engaging said gear being pivotally mounted in said opening in said second end of said handle member, said pawl having a first arm and a second arm, wherein said first arm of said pawl may engage said teeth on said gear when said rod is positioned between said protruding members;
      an urging means urges said first arm toward said gear;
      an actuating means for releasing said pawl from said gear, said actuating means comprising;
         a pole, said pole being movably mounted in said lumen, said pole having a first end and a second end, said first end being positioned generally adjacent to said aperture in said handle member, said first end being angled with respect to a longitudinal axis of said pole, said pole having an annular ridge thereon;

an annular shoulder being integrally coupled to and extending away from an inner peripheral side of said lumen, said annular shoulder being positioned between said annular ridge and said second end of said pole;

a biasing means biases said second end of said pole away from said pawl, said biasing means comprising a spring, said spring being positioned on said pole and being located between said annular shoulder and said annular ridge such that said spring may abut said annular shoulder and said annular ridge;

a button, said button being movably positioned in said aperture, said button having a bottom edge, said bottom edge being located to slidably engage said first end of said pole; and wherein said button moves said pole toward said pawl when said button is extended into said aperture, wherein said second end of said pole may abut said second arm of said pawl such that said first end of said pawl may disengage with said teeth on said gear, wherein said blade member may pivot with respect to said handle member.

5. An adjustable shovel device, said device comprising:

an elongate handle member having a first end and a second end;

a blade member having a front surface and a back surface and a back edge;

a rod attached to and extending away from said back edge of said blade member;

a pair of protruding members being coupled to and extending away from said second end of said handle member, said protruding members being spaced such that said protruding members are positionable on opposite sides of said rod, said protruding members being pivotally coupled to said rod such that said blade member is pivotable with respect to said handle member;

a locking means for selectively locking a pivot position of said handle member with respect to said blade member;

wherein said rod has a free end with a channel formed therein, said rod having a pair of opposed holes therein extending into said channel.

6. The adjustable shovel device as in claim 5, wherein said handle member has a lumen therein, said lumen extending between said first and second ends, said second end having an opening therein extending into said lumen, said handle member having an aperture therein extending into said lumen, said aperture being positioned generally adjacent to said first end.

7. The adjustable shovel device as in claim 5, wherein said locking means comprises a gear attached to said rod and positioned in said channel, said gear having a plurality of teeth formed thereon; a pawl for engaging said gear being pivotally mounted in said opening in said second end of said handle member, said pawl having a first arm and a second arm, wherein said first arm of said pawl is engagable with said teeth on said gear when said rod is positioned between said protruding members; and an urging means urges said first arm toward said gear.

8. The adjustable shovel device as in claim 7, wherein said handle member has a lumen therein, said lumen extending between said first and second ends, said second end having an opening therein extending into said lumen, said handle member having an aperture therein extending into said lumen, said aperture being positioned generally adjacent to said first end; and wherein said locking means further comprises an actuating means for releasing said pawl from said gear, said actuating means comprising:

a pole movably mounted in said lumen, said pole having a first end and a second end, said first end being positioned generally adjacent to said aperture in said handle member;

a biasing means for biasing said second end of said pole away from said pawl; and a button movably positioned in said aperture, said button having a bottom, said bottom being slidably engagable with said first end of said pole;

wherein said button moves said pole toward said pawl when said button is extended into said aperture, said second end of said pole being abuttable against said second arm of said pawl such that said first end of said pawl disengages from said teeth on said gear, wherein said blade member is pivotable with respect to said handle member.

* * * * *